Figure 1:
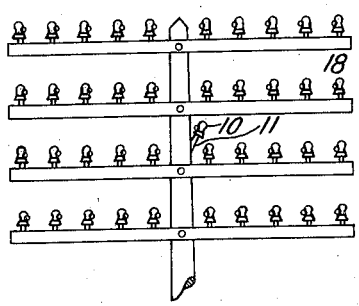

July 4, 1933.      D. A. QUARLES      1,917,061
COMPOSITE TRANSMISSION SYSTEM
Filed March 30, 1929      3 Sheets-Sheet 1

INVENTOR
D. A. QUARLES
BY
ATTORNEY

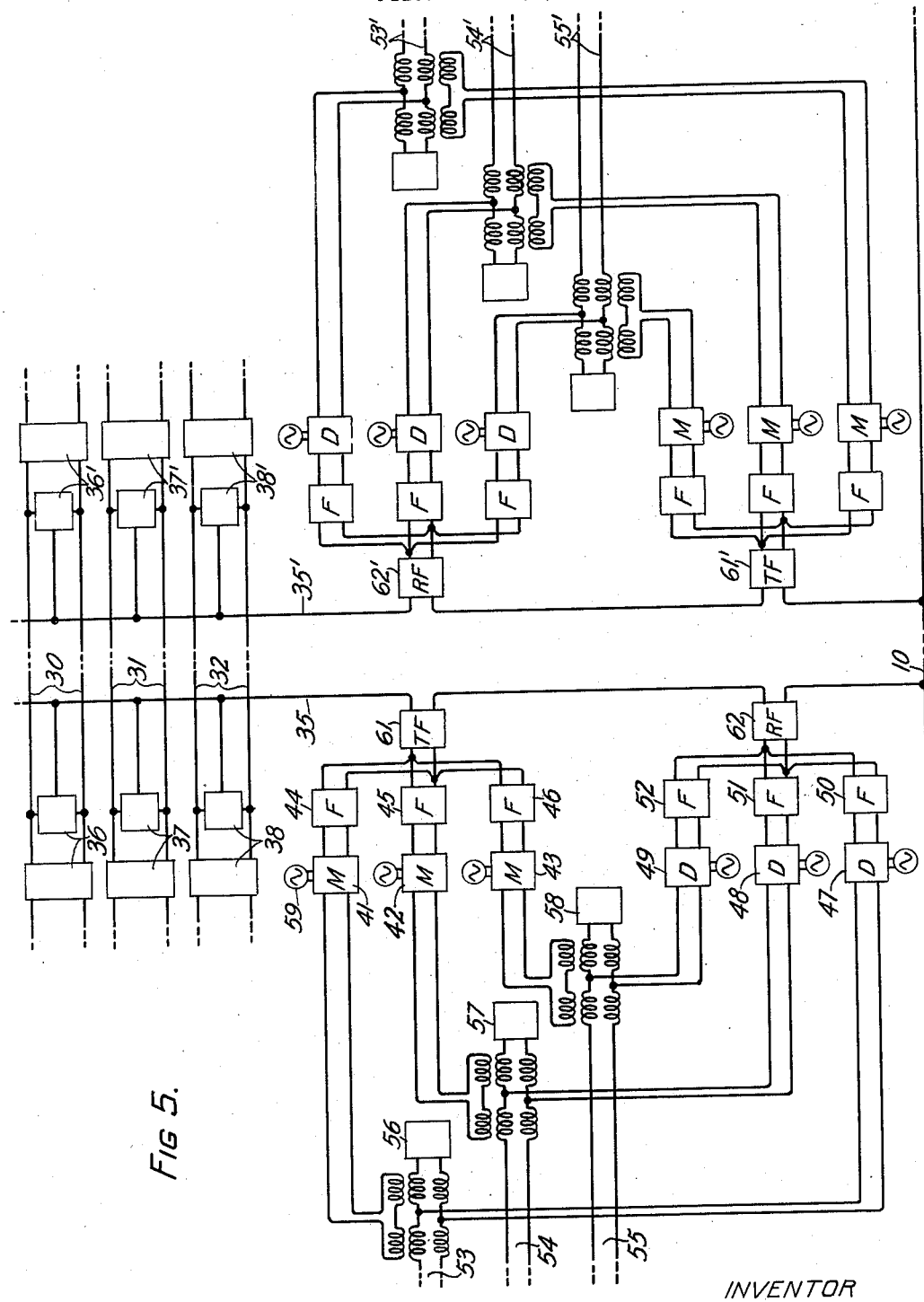

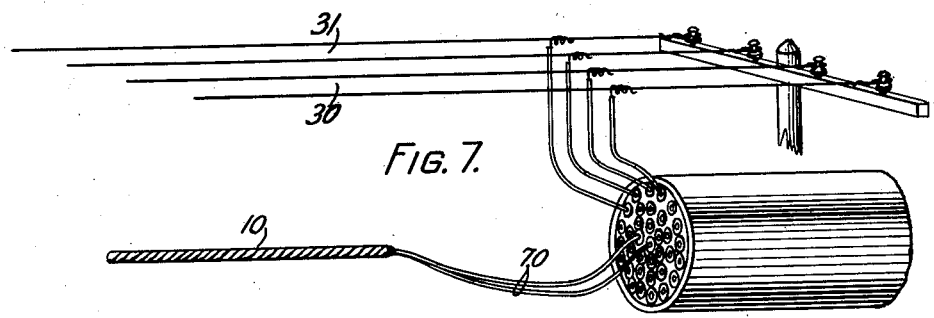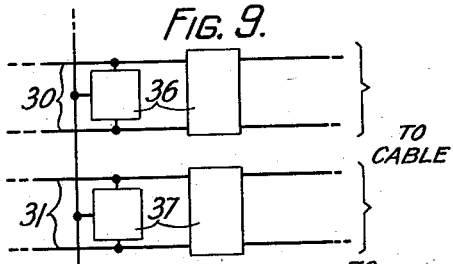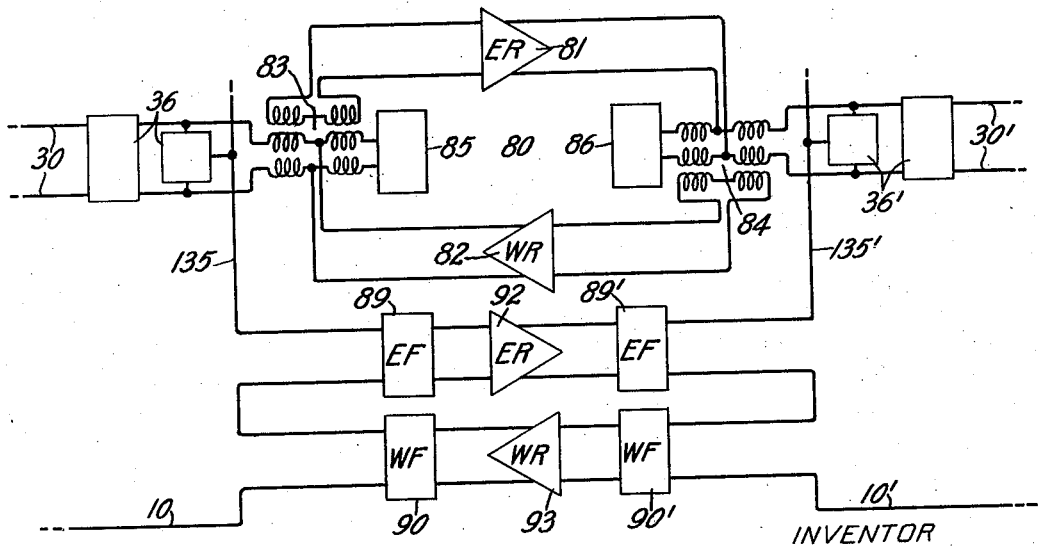

Patented July 4, 1933

1,917,061

UNITED STATES PATENT OFFICE

DONALD A. QUARLES, OF ENGLEWOOD, NEW JERSEY, ASSIGNOR TO BELL TELEPHONE LABORATORIES, INCORPORATED, OF NEW YORK, N. Y., A CORPORATION OF NEW YORK

COMPOSITE TRANSMISSION SYSTEM

Application filed March 30, 1929. Serial No. 351,303.

The present invention relates to a composite transmission system adapted particularly to multiplex carrier wave transmission.

An object of the invention is to increase the signal transmission capabilities of existing systems. This object is attained in accordance with the invention by compositing existing circuits to provide a number of additional circuits in the form of carrier channels, without disturbing the existing circuits.

It is found in practice that, in adding carrier channels to an existing line, a point is reached at which the cost of line transpositions and other factors in the outside plant construction make it uneconomical to add more channels, since from this point on carrier channels prove more costly than other means capable of giving the same service.

One of the difficulties of using higher and higher frequencies for carrier transmission arises from the inductive effects between neighboring circuits. Another difficulty comes from the excessive attenuation of an ordinary line at very high frequencies. There is also considerable loss by absorption in external structures or circuits, with accompanying interference between circuits.

The present invention surmounts to a large degree these difficulties and affords an economical and effective means for increasing the carrying capacity of existing lines.

According to the invention, a central conductor (or conductors) transmitting in one direction is (or are) arranged in electrical symmetry with respect to a plurality of conductors transmitting in the opposite direction. Different spacial arrangements of the conductors are possible but the preferred way is to surround the single conductor (or group) by the conductors transmitting in the opposite direction. This arrangement substantially restricts the electromagnetic field to the space comprised within the outer conductors. The transmission efficiency is thus kept high by reducing the absorption of electromagnetic energy in extraneous structures or circuits. Such arrangement also minimizes the disturbing effects of extraneous electromagnetic fields. Some or all of the conductors entering into this substantially concentric arrangement may be used also for other transmissions on individual circuits or in other combinations.

The invention is applicable to open wire lines and to cables and will be described in connection with both.

The detailed description contained in the following specification, of which the accompanying drawings form a part, will give a more complete idea of the nature and objects of the invention, both as to its broad aspects and to such subsidiary features as the compositing circuits, toll entrance requirements, cable terminal constructions, repeaters or repeater by-pass constructions, crossings, etc.

Figure 2:
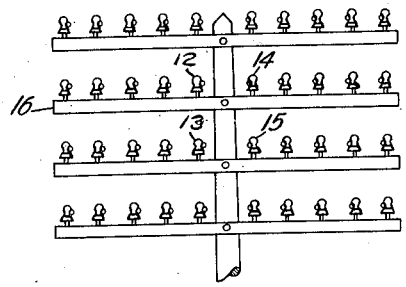
Figure 3:
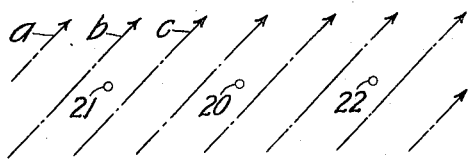
Figure 4:
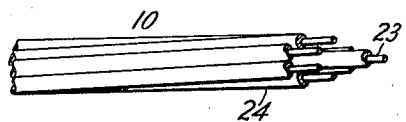
Figure 6:
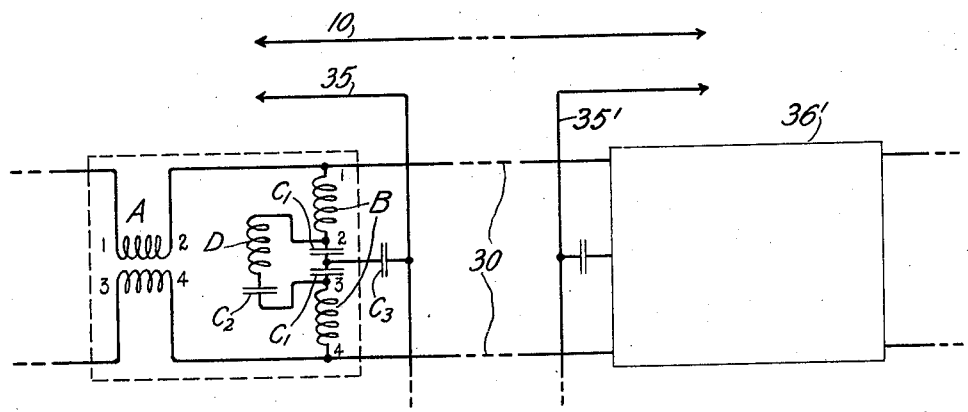

In the drawings Figs. 1 and 2 illustrate two arrangements which the invention may take when applied to toll line constructions. Fig. 3 is a diagram of a simple arrangement of conductors in accordance with the invention to show the electrical symmetry of the circuit with respect to a uniform external or disturbing field. Fig. 4 illustrates the preferred construction for the special return conductor. Fig. 5 is a schematic circuit diagram in simplified form of both terminals of a complete composited system embodying the invention. Fig. 6 is a detailed showing of a composite network which is suitable for use with the invention. Figs. 7, 8 and 9 illustrate different types of toll entrance cable connections and Fig. 10 illustrates in simplified diagrammatic form a composited repeater circuit.

Fig. 1 shows a standard type of pole and cross-arm construction employed on open wire lines, this construction accommodating 40 line wires. In accordance with the invention as described above, all of these 40 line wires may, by the use of suitable compositing networks to be described later on, be connected effectively in parallel as regards the transmission of a broad band of carrier frequencies comprising a number of channels. A special conductor indicated at 10 in the figure forms the return circuit for these high frequency carrier waves. This conductor 10 is shown supported by a special bracket and insulator 11 on the telephone pole and the conductor is preferably positioned at the center of the space occupied by the 40 line wires.

It will be understood, of course, that the invention is not limited in any sense to the employment of any particular number of line wires nor to the positioning of the return conductor at the exact center point of the conductors, however many of the latter are used for transmission of the high frequency carrier waves. For example, in the case of a toll line carrying 40 wires it is within the invention to divide these lines into groups and to position at or near the center of each group a return conductor such as conductor 10 of Fig. 1. In this case conductors of each group are connected in multiple as regards the high frequency carrier waves and form one side of a metallic circuit the opposite side of which is formed by a special conductor such as 10.

Instead of using a single return conductor 10 a number of conductors in parallel may be employed. In Fig. 2, for example, it is assumed that all of the 40 line wires except the wires 12, 13, 14 and 15 are connected in multiple as regards the high frequency carrier waves and that the central group of conductors 12, 13, 14 and 15 are connected in multiple to form the opposite side of the circuit. These central conductors 12—15 may be set aside for use exclusively as the return for the high frequency carrier circuit, but it is preferable merely to select four centrally positioned telephone line wires for this purpose. Where conductors 12 to 15 are ordinary telephone line wires, compositing networks to be described later are used in connection with these as in connection with other line wires to enable the high frequency carrier waves to be superposed on the circuits without interfering with the use of these conductors for ordinary telephone conversations. As will appear more fully later on the line wires may serve for ordinary telephone conversations, or may be connected to provide phantom circuits, or may be composited with carrier channels as individual metallic circuits, or used in any other manner that is customary in the telephone plant.

As in the case of Fig. 1 the total number of conductors may be subdivided into groups each of which comprises a set of conductors for transmitting the high frequency carrier waves in one direction and another set symmetrically positioned with respect to the first set and serving as a return. Where the entire group of conductors on a toll line is used as one composited circuit for the high frequency carrier channels, or for more than one such circuit the group used as the return conductors such as 12 to 15 may comprise a single pair of wires, or a number of pairs of wires as desired.

The arrangements described in connection with Figs. 1 and 2 comprise a substantially concentric position of the conductors, i. e., the inner conductors are substantially surrounded in space by the outer conductors. While in general this configuration is preferred it is within the invention to arrange the conductors as shown in Fig. 3 where the central return conductor 20 is placed between the conductors, such as 21 and 22 forming the other side of the circuit. The arrows, $a$, $b$, $c$, etc., in this figure indicate magnetic or electrostatic lines of force extending through the circuit formed by the conductors 20 and 21, 22. Such an external field is without substantial effect upon this circuit so long as the lines of force extending through each side of the loop are the same. While only three conductors are shown in Fig. 3 the principle illustrated may, of course, be extended to any number of conductors.

Where a single return conductor such as 10 of Fig. 1 is employed it may be desirable to design this conductor to be efficient for the transmission of the high frequencies that are employed by the superposed carrier channels. A suitable construction for this conductor is shown in Fig. 4. This construction employs a central core 23 of high tensile strength material surrounded by insulated strands of copper shown at 24. These copper wires or strands are individually insulated in order to reduce losses due to the "skin effect". This conductor is preferably suspended on low capacity insulators of any suitable type.

The electrical connections for superposing the composited high frequency channels on the existing line wires are illustrated in a general way in Fig. 5. In this figure the line wires such as are shown in Figs. 1 and 2 as supported on poles are indicated at 30, 31 and 32. (As will appear more fully hereinafter, these lines may also be included in a cable.) Only three lines are indicated in Fig. 5 but it will be clear from the circuit description how the connections may in practice be extended to any desired number of lines. Between the group of lines 30 to 32 and the special conductor 10 shown at the bottom of the figure there is a derived circuit connection 35 at each terminal of the high frequency composited system. This derived conductor 35 is electrically connected to the lines 30 to 32 by the aid of compositing circuits 36, 37, 38 the nature of which will be described more fully in connection with Fig. 6. It will be clear from the diagram of Fig. 5 that the line wires 30 to 32 are connected in multiple as regards the derived circuit 35 and that these lines as a group form one side of a composite circuit, the opposite side of which is formed by conductor 10.

The conductor 35 at the left in the figure is shown connected to a group of transmitting and a group of receiving channels which cooperate with similar groups connected with conductor 35' at the right of the figure. Since the circuits at the two ends may be exact counterparts of each other it will suffice to describe the arrangement at the left terminal. For the sake of illustration three transmitting and three receiving channels are shown although it will be understood that any suitable number of channels may be used and that the number bears no necessary relation to the number of line wires on which the channels are composited. Each transmitting channel includes a modulator 41, 42 or 43 and a band filter 44, 45 or 46. Each receiving channel includes a demodulator 47, 48 or 49 and a filter 50, 51 or 52. A transmitting channel is paired with a corresponding receiving channel and connected by a conjugate connection to one of the terminal telephone lines 53, 54 or 55. These lines are provided with balancing networks 56, 57 or 58 in accordance with the usual practice. For a fuller disclosure of a terminal system for a multiplex carrier system the United States patents to Espenschied 1,493,619 of May 13, 1924 and 1,500,552 of July 8, 1924 may be consulted.

Each of the modulators and each of the detectors is supplied with a carrier wave of an appropriate frequency from an oscillator one of which is indicated at 59. These oscillators are preferably of the vacuum tube type such as disclosed in the U. S. patent to Hartley 1,356,753 dated October 26, 1920. Each of the modulators and each of the demodulators may be of the type disclosed in U. S. patent to Carson 1,343,306 dated June 15, 1920 and each of the filters may be constructed in accordance with the principles disclosed in U. S. patent to Campbell, 1,227,113 dated May 22, 1917.

The transmitting channels as a group are connected to the conductor 35 through the transmitting grouping filter 61 and the receiving channels as a group are connected through the receiving grouping channel 62.

In operation speech waves received over telephone line 53 modulate in modulator 41 the carrier waves supplied from oscillator 59 to produce side band frequencies in the output of the modulator. While the modulators used may be of a type such as not to suppress the unmodulated carrier component they are preferably of the type shown in the Carson patent, i. e., they suppress the unmodulated component and produce in the outgoing circuit only an upper and a lower side band. The filter 44 is designed preferably to pass one of these side bands to the exclusion of the other. This side band after suitable amplification in amplifiers (not shown) passes through transmitting filter 61 to the conductor 35 and is impressed upon the transmission circuit of which one side is formed by the conductor 10 and the opposite side by the group of line circuits 30, 31, 32, etc. for transmission to the distant terminal.

In a similar manner speech waves received over lines 54 and 55 modulate carrier waves of respectively different frequencies in modulators 42 and 43 and the corresponding side bands are transmitted through filters 45 and 46 and terminal filter 61 to the conductor 35 for transmission to the distant station.

The frequencies employed for transmission from the station at the left in Fig. 5 are comprised in a range either higher or lower than those received at this station, i. e., the frequencies transmitting in opposite directions are in mutually exclusive bands. The receiving filter 62 is designed to pass all of the receiving frequencies. A side band of the appropriate frequency to pass filters 62 and 50 is combined in the demodulator 47 with a carrier wave of the appropriate frequency to produce speech waves in the output circuit which in turn are impressed on the telephone line 53. In a similar manner side bands of frequencies selected by the other receiving channel filters respectively are demodulated and the resulting speech waves impressed upon lines 54 and 55.

The receiving filter 62' at the right-hand terminal of Fig. 5 is designed to pass the same frequencies as the transmitting filter 61 at the left-hand station and the transmitting filter 61' transmits the same frequencies as the receiving filter 62. Likewise the side band filters in the receiving channels at the right-hand terminal are accommodated to those of the transmitting channels at the left terminal and the same cooperative relationship holds for the transmitting channels at the right terminal and the receiving channels at the left terminal. The transmitting and receiving channels at the right terminal operate in a manner analogous to that described for the left terminal, therefore, to effect transmission between the high frequency conductor 35' and the telephone lines 53', 54' and 55'. Each pair of lines 53, 53' and 54, 54', etc., may communicate over the high frequency composited system terminating in the conductors 35 and 35'.

The frequencies employed as carrier waves in this composited system may extend to much higher limits than in the present practice where the carrier channels are superposed on a single ordinary telephone line. As was explained earlier, the present practice of superposing the channels on the individual telephone lines reaches a practical limit as attempt is made to employ higher frequency channels on account of the high cost of transpositions and other difficulties. The symmetrical positioning of the conductors forming the two sides of the circuit in accordance with the present invention as described in connection with the foregoing figures is well adapted, however, to the transmission of frequencies very much in excess of the practical limit for present practice. The electromagnetic field set up by the transmitted waves is substantially confined to the space bounded by the outer conductors. Interference between neighboring lines is thus very greatly reduced and loss by absorption in external circuits or structures is small so that frequencies well in excess of 100 kilocycles per second may be used for transmitting and receiving in the channels illustrated in Fig. 5, in accordance with this invention.

A type of composite network suitable for use at the points 36, 37, 38 in the system of Fig. 5 is shown in detail in Fig. 6. It is assumed in this figure that the line conductors 30 carry ordinary telephone conversations, metallic circuit or grounded telegraph transmissions and carrier telephone or carrier telegraph channels (or both) employing frequencies up to the order of 30 kilocycles per second. Let it be assumed that the dividing frequencies between the Morse telegraph signals and the lower limit of the telephone currents is of the order of 150 cycles per second (frequency $f_1$), while the dividing frequency between the upper speech limit and the lower limit of the carrier telephone range is of the order of 3200 cycles per second (frequency $f_3$).

The shunt portion of the composite network as shown in Fig. 6 comprises coils B (1—2, 3—4 series aiding) and D, and condensers $C_1$, $C_1$ and $C_2$. This structure will be resonant at the two frequencies $f_1$ and $f_3$ and anti-resonant at frequency $f_2$ when given the following design formulæ where B is small as compared with D and $C_1$ is small as compared with $C_2$:

$$f_1 = \frac{1}{2\Pi\sqrt{(B+D)C_2}};$$
$$f_2 = \frac{1}{2\Pi}\sqrt{\frac{C_1+2C_2}{D \cdot C_1 \cdot C_2}};$$
$$f_3 = \frac{1}{2\Pi\sqrt{BC_1/2}};$$

(where frequencies are expressed in cycles per second, inductances in henries and capacities in farads). When frequencies $f_1$ and $f_3$ are given the values indicated above, i. e., the dividing frequencies between the different frequency ranges to be transmitted, the bridging effect of the composite set can be made negligibly small at transmission frequencies. Coil A (1—2, 3—4 series aiding) is a carrier frequency choke coil to keep the composited carrier frequencies that are transmitted in accordance with the present invention from entering the terminal circuits of the line 30.

Condenser $C_3$ is used where the telephone lines such as 30 are phantomed, the purpose of this condenser being to reduce the transmission loss caused by the composite set for voice frequencies flowing in the phantom circuit. Condenser $C_3$ is made small enough therefore to exclude speech currents. Where the telephone lines are not phantomed the condenser $C_3$ may be omitted. It will be clear that the composite network 36' shown in Fig. 6 at the opposite terminal of the line 30 may be constructed similarly to the one that has been shown and described in detail.

Fig. 6 and the description that has been given of it assumes that the opposite side of the composited carrier system is formed by special conductor 10. In the case where the return is formed by existing line conductors as indicated in Fig. 2 it will be clear that compositing networks are to be used on these lines for enabling the composited carrier channels to be superposed on these lines (such as 12, 13, 14, 15 of Fig. 2) as a group. The compositing networks for these lines may be identical with that shown in Fig. 6.

As stated above the ultra high frequency carrier channels may be superposed upon lines carried in a cable in the same way that has been described for the case of open wire lines. One side of the circuit may be formed by all or a part of the usual cable conductors in parallel, and the opposite side of the circuit for the high frequency carrier channels may be formed by a special conductor or by a group of the regular circuits. In either case it is preferable to locate the special conductor, or the second mentioned group of conductors, at or near the center of the cable. Fig. 7 illustrates in simplified fashion one manner of connecting an open wire system in accordance with the invention with the terminal of a cable. It is assumed in this case that the cable is a relatively short toll entrance cable. The open wire lines 30, 31, etc., are individually connected to the corresponding lines in the cable and the special return conductor 10 is connected to a special pair or quad 70 at the center of the cable. All of the ordinary transmissions carried by the lines 30, 31 such as Morse telegraph, speech currents and carrier currents pass directly into the corresponding individual cable conductors. Also the high frequency composited carrier waves transmitted by the open wire conductors as a group are transmitted in parallel by the cable conductors, the return for these being provided by the special conductor 10 and by the special quad 70 or pair in the cable.

In the case where the centrally positioned return path for the composited carrier channels consists of a group of open wire conductors instead of the special conductor 10, these conductors would be connected to corresponding centrally located cable pairs in the same manner that the lines 30 and 31 of Fig. 7 are connected to the outer pairs of the cable. This type of connection may extend to all of the cable pairs although Fig. 7 illustrates the connections as being made to only a few.

While the type of connection shown in Fig. 7 will suffice for relatively short toll entrance cables it is preferable in the case of somewhat longer cables to provide a special low capacity conductor 71 (see Fig. 8) near the center of the cable for connection to the special conductor 10 of the open wire system. This conductor 71 is shown as surrounded by insulation 72 of sufficient thickness to space the conductor 71 from the ordinary conductor pairs in the cable so as to reduce the capacity between conductor 71 and the cable pairs. Conductor 71 may be constructed of stranded wire similar to special conductor 10 to reduce losses due to "skin effect". The connections between the open wire lines and the cable in Fig. 8 may be the same as those described above in the case of Fig. 7.

Where the telephone cable is too long to permit of transmitting the composited high frequency carrier waves through it a type of connection shown in Fig. 9 may be employed. Here it is assumed that the open wire lines 30, 31, etc. are to be connected to a long telephone cable. These lines are provided with composite networks 36, 37, etc. of the type previously described for deriving a terminal connection 135 for the high frequency composited channel. Beyond these networks the open wire lines continue to the cable junction point.

The derived circuit conductor 135 is connected preferably through the primary of the transformer 74 to the special return conductor 10 which serves as the return for the open wire lines 30, 31, etc. as a group.

In this case the long telephone cable is paralleled by a conductor of special construction shown at 75. This conductor is described and claimed in my copending application, Serial No. 351,304, filed March 30, 1929, Patent No. 1,873,477, issued August 23, 1932, to which reference may be made for a more complete description. It is sufficient for present purposes to state that the special conductor 75 comprises an outer cylindrical shell 76 and an inner cylindrical core 77. These coaxial cylinders 76 and 77 are preferably formed by braiding metallic strands to form non-collapsing, but relatively flexible cylinders of high electrical conductivity, but small capacity to each other. The coaxial alignment of the cylinders is obtained by the use of tension members some of which are shown at 78. These may consist of cords of some suitable textile material which may be braided into the structure along with the metallic strands. These tension members serve to suspend the inner conductor from the outer and at the same time possess low dielectric capacity so that the space between the conductors contains substantially only air.

This special conductor 75 may be placed underground or suspended on a telephone toll line to traverse the same distance as the telephone cable if the high frequency composited circuit is to be carried to open wire lines at the opposite terminal of the cable. Such a situation may occur when a transcontinental line, for example, passes through cities, or underneath lakes or rivers. Connection is made to the special conductor 75 by merely connecting the secondary 79 of the transformer to the conductors 76 and 77 respectively.

At repeater points on the lines 30, 31, etc., the circuit for the composited high frequency carrier channels may be by-passed around the repeaters either with or without the inclusion of amplifying repeaters in the composited circuit. In Fig. 10, for example, the line 30 is shown as comprising sections 30 and 30' between which there is connected a usual 22-type telephone repeater 80 comprising an east repeater 81 and a west repeater 82. Conjugate coil connections 83 and 84 and balancing networks 85 and 86 as ordinarily used are shown.

It will be understood that other lines 31, 32, etc., not shown in this figure would contain similar individual repeaters. Moreover, these individual lines might be provided with carrier repeaters or carrier by-pass connections as disclosed more fully in the Espenschied patents hereinbefore referred to.

In order to continue the composited circuit for the high frequency carrier channels around the repeating point, compositing networks 36, 36' of the type previously described, are connected in the various individual telephone lines in order to derive the conductors 135, 135' for the composited carrier waves. Connected between conductor 135 and the return conductor 10 are grouping filters 89 and 90 for passing the eastward and westward groups of frequencies respectively that are used for the composited high frequency channels and similar filters 89' and 90' are connected between derived conductor 135' and special conductor 10'. An eastward repeater 92 is shown connected between the filters 89 and 89' and a westward repeater 93 is similarly connected between the westward grouping filters 90 and 90'.

If the repeater spacing is not the same for all of the different kinds of transmissions carried by the lines 30, 31, etc., a repeater may be provided at any point for one of the types of transmission and a suitable by-pass circuit or circuits may be provided for the other transmissions. For example, in Fig. 10 instead of providing the repeater 80 for telephone currents a non-amplifying by-pass circuit such as a repeating coil may be used presenting low impedance between the line sections 30 and 30' for the speech frequencies, but high impedance for the high frequency composited carrier channels. The latter are then transmitted through the repeaters 92, 93.

It will be understood that in each instance where a special return conductor 10 has been referred to a group of ordinary line conductors may be employed instead as was described more fully in connection with Fig. 2. In the case where the high frequency composited channels are not divided into eastward and westward channels but are all used for transmitting in the same direction it will not be necessary, of course, to provide the grouping filters 61, 62, 89, 90, etc., or the oppositely directed repeaters 92 and 93, but a single repeater or a single by-pass may be employed to transmit the entire band of frequencies. This situation would be used, for example, in a television system where a wide range of frequencies is transmitted in only one direction.

The various interconnecting, terminating and other special provisions that have been illustrated and described for enabling the high frequency composited channels to be carried by ordinary telephone circuits are, of course, capable of considerable variation as are also the dispositions of the lines, cables, etc. to suit transmission requirements that may be met in practice. All of these specific provisions are to be considered therefore as illustrative rather than as limiting and the invention is to be construed broadly as determined by the scope of the appended claims.

What is claimed is:

1. A wave transmission system comprising a conductor forming one side of a transmission line and a plurality of conductors in parallel forming the return, said latter conductors surrounding said one conductor symmetrically in space and serving also for other circuits.

2. A composite transmission system comprising a plurality of conductors some of which comprise separate transmission circuits for message currents and all but one of which together make up an array of conductors spaced around said one conductor symmetrically and forming in parallel one side of another circuit of which said one centrally positioned conductor is the return.

3. In a wave transmission system, conductors including pairs, certain pairs of which are connected in multiple to form one side of a composite transmission circuit, the return for which is located within the space bounded by said certain conductors and symmetrically electrically with respect thereto.

4. In a wave transmission system, conductors paralleling one another and electrically isolated from one another along their lengths, including pairs, at least one of which conductors is positioned between pairs of the others and has electrical symmetry relative to them as respects an external interfering field, means for utilizing said one conductor as one side of a composite wave transmission system and means to use said pairs of other conductors in common as the opposite side of said system.

5. A system in accordance with claim 4 in which said other conductors also serve in pairs as transmission circuits for other kinds of transmission.

6. A system in accordance with claim 4 in which said other conductors are metallic telephone lines for transmitting telephonic messages and are also composited for D. C. telegraph transmission.

7. A system in accordance with claim 4 in which said other conductors are also connected in pairs to serve as individual circuits for multiplex carrier wave transmission.

8. An open wire line comprising a group of conductors strung on a pole lead and forming individual transmission pairs, another conductor centrally positioned with respect to the conductors of said group, and means for compositing high frequency carrier channels on said group of conductors in multiple, with said other conductor as the return.

9. An open wire system comprising the usual pole and cross-arm construction and a group of lines supported thereon, means at distantly separated points for operatively associating with said lines in common a derived conductor without interfering with the use of said lines for transmission individually or in groups, a special line-conductor centrally and substantially symmetrically positioned electrically with respect to said group of lines, and means for superposing high-frequency carrier wave channels on the composite circuit formed by said group of lines, said special line conductor and said derived conductors.

10. An open wire line comprising a central group and an outer group of conductors carried on a pole system, the outer group being located in space on opposite sides of the central group and electrically symmetrically with respect thereto, and means for compositing high-frequency carrier channels on one of said groups of conductors in parallel, the other group of conductors serving in multiple as the return, the conductor comprising each group serving in pairs for the transmission of other message waves.

11. A signal transmission system comprising a cable containing a number of pairs of conductors serving as telephone line circuits, and a composite transmission circuit formed by one or more conductors near the center of the cable as one side of the circuit and a number of said telephone pairs surrounding said central conductors connected in multiple as the return side of said composite circuit, said composite circuit serving in common for a number of high-frequency carrier wave channels.

12. A system as claimed in claim 11 in which the centrally located portion of the composited system is spaced from the surrounding conductors to reduce the shunt capacity of the composite system.

13. In a repeater telephone transmission system, means to superpose carrier channels upon a number of telephone line circuits in multiple, means at a repeater station for deriving from the multiple telephone line circuits a circuit in which the carrier channel waves flow to the exclusion of telephone currents, and transmission paths at the repeater station connecting opposite lines sections with one another and said derived circuit with a similar circuit derived from said opposite line sections in multiple, certain of said transmission paths containing amplifying repeaters.

14. A system as defined in claim 13 in which each of said derived circuits is connected to a pair of directional filters for separating eastward from westward carrier channels, and an amplifying repeater connecting each pair of filters, eastward to eastward and westward to westward.

15. A long toll line connection including open wire-lines and cable, means to transmit carrier waves over a number of the open-wire lines in multiple, a return for the carrier wave transmission circuit comprising a conductor located centrally of the multiple-connected lines, means to transmit speech waves over the individual open-wire lines and cable circuits in tandem, means at the cable junction point for deriving from the multiple-connected lines and central conductor a circuit in which the carrier waves flow to the exclusion of speech waves, and a special low-capacity coaxial conductor line connected to said derived circuit and parallelling the cable and traversed by said carrier waves.

In witness whereof, I hereunto subscribe my name this 29th day of March, 1929.

DONALD A. QUARLES.